July 9, 1940.  E. C. GUEDON  2,207,251
ELECTRIC MOTOR
Filed July 30, 1938
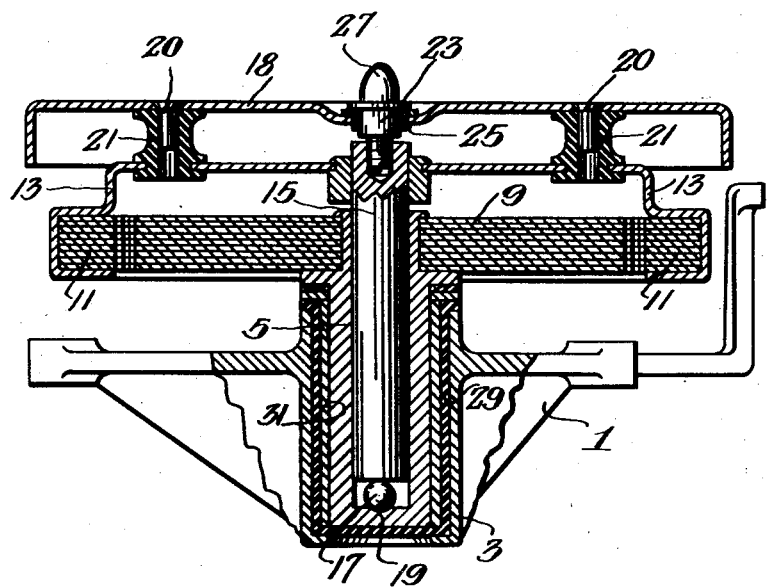
Inventor
Emile C. Guedon
By
Attorney Patented July 9, 1940

2,207,251

UNITED STATES PATENT OFFICE 2,207,251

ELECTRIC MOTOR

Emile C. Guedon, Audubon, N. J., assignor to Radio Corporation of America, a corporation of Delaware Application July 30, 1938, Serial No. 222,167

4 Claims. (Cl. 172—36)

This invention relates to electric motors and more particularly to a synchronous motor suitable for use in phonographs, the present invention being an improvement upon that disclosed in U. S. patent to Roys No. 2,113,384, granted April 5, 1938.

In the aforesaid patent, there is disclosed a synchronous motor comprising a frame provided with a hub in which is rotatably mounted a turntable spindle. While a motor of this type is satisfactory for many purposes, I have found that occasionally mechanical vibrations are transmitted from the frame to the turntable mounted on the spindle and the record supported thereby, inasmuch as the bushing within which the spindle rotates is carried directly by the hub. The transmission of such vibrations is partly responsible for the production of what is known as "rumble", with the resulting distortion of the reproduced sound.

The primary object of my present invention is to provide an improved synchronous motor wherein the foregoing difficulty is eliminated.

More specifically, it is an object of my present invention to provide an improved motor wherein mechanical vibrations in the frame will not be transferred to the turntable and the record supported thereby at the time of reproduction.

A further object of my present invention is to provide an improved synchronous motor of the type set forth which is inexpensive of manufacture, which readily lends itself to rapid quantity production, and which is highly efficient in use.

In the copending application of Gregory W. Blessing and myself, filed November 5, 1937, Serial No. 172,886 (now Patent No. 2,157,158, granted May 9, 1939), there is disclosed and claimed, among other things, a motor of the type here under consideration wherein the turntable is coupled to the rotor element by means of a plurality of resilient coupling devices capable of absorbing any slight mechanical vibrations originating in the motor without transferring them to the turntable. According to my present invention, I interpose a rubber sleeve between the frame hub and the bushing which carries the turntable spindle. This further reduces and minimizes the possibility of "rumble" by preventing motor vibrations from reaching the reproducing pickup which contacts the record.

The novel features that I consider characteristic of my invention are set forth with particularity in the appended claims. The invention itself, however, both as to its organization and method of operation, together with additional objects and advantages thereof, will best be understood from the following description of one embodiment thereof, when read in connection with the accompanying drawing, in which the single figure is a central sectional view of a motor according to my present invention.

Referring more particularly to the drawing, I have shown a motor comprising a frame 1 provided with a hub 3 in which a bushing 5 is received, the upper end of the bushing 5 extending beyond or above the hub 3 and being secured to a laminated stator 9 of the type more fully set forth in the above identified Roys patent. Surrounding the stator 9 and cooperatively associated therewith is an annular rotor 11 carried by a spider 13 which is fixed to the upper end of a spindle or shaft 15 mounted for rotation in the bushing 5 and resting upon a thrust bearing 17 seated in a depression 19 in the bushing 5. A record supporting turntable 18 is connected to the spider 13 by means of a plurality of pins 20 and resilient coupling members 21, in a manner more fully set forth and claimed in the above identified copending application of Blessing and myself. The turntable 18 is provided with a record centering spindle 23 which may be threaded into the upper end of the shaft 15 and which is insulated from the turntable 18 by means of a rubber bushing 25, the spindle 23 preferably also being provided with a rubber sleeve 27, all as more fully described and claimed in the aforesaid copending application to prevent vibrations arising in the motor from reaching the pickup (not shown).

To further prevent vibrations originating in the motor from reaching the turntable and record supported thereon with which the pickup is cooperatively associated, I interpose a soft rubber sleeve 29 between the hub 3 and the bushing 5. Preferably, however, I also interpose a metallic bushing or sleeve 31 between the rubber sleeve 29 and the bushing 5 to act as a bearing surface for the bushing 5 when the latter is caused to oscillate by slight oscillation of the stator 9, as is characteristic of this type of motor. It will be noted from the drawing that the rubber sleeve 29 completely isolates the bushing 5 with its shaft 15 and all the parts carried thereby from the hub 3 of the frame 1, thereby serving effectively to prevent the transmission of mechanical vibrations between the hub 3 and the bushing 5.

Although I have shown and described but one modification of my invention, it will, no doubt, be readily apparent to those skilled in the art that many modifications thereof are possible. For example, in place of the rubber sleeve 29, an oil saturated felt sleeve may be employed. Other changes will, no doubt, readily suggest themselves to those skilled in the art, and I therefore desire that my invention shall not be limited except insofar as is made necessary by the prior art and by the spirit of the appended claims.

I claim as my invention:

1. In an electric motor, the combination of a supporting frame including a hub, a bushing within said hub extending beyond one end thereof, a spindle rotatable in said bushing, a supporting device carried by said spindle for rotation therewith, a stator mounted on the extension of said bushing, a rotor also carried by said spindle and cooperatively associated with said stator, and means interposed between said hub and said bushing for preventing mechanical vibrations from being transmitted from said frame to said supporting device.

2. In an electric motor, the combination of a supporting frame including a hub, a bushing within said hub extending beyond one end thereof, a spindle rotatable in said bushing, a supporting device carried by said spindle for rotation therewith, a stator mounted on the extension of said bushing, a rotor also carried by said spindle and cooperatively associated with said stator, and resilient means interposed between said hub and said bushing for preventing mechanical vibrations from being transmitted from said frame to said supporting device.

3. In an electric motor, the combination of a supporting frame including a hub, a bushing within said hub extending beyond one end thereof, a spindle rotatable in said bushing, a supporting device carried by said spindle for rotation therewith, a stator mounted on the extension of said bushing, a rotor also carried by said spindle and cooperatively associated with said stator, and a sleeve of soft rubber interposed between said hub and said bushing for preventing mechanical vibrations from being transmitted from said frame to said supporting device.

4. The invention set forth in claim 3 characterized in that said stator is subject to slight oscillations, and characterized further by the addition of a metal bearing sleeve interposed between said rubber sleeve and said bushing to act as a bearing surface for said bushing upon oscillation of said stator.

EMILE C. GUEDON.